(12) United States Patent
Knepper et al.

(10) Patent No.: US 9,606,664 B2
(45) Date of Patent: Mar. 28, 2017

(54) DYNAMIC HOVER SENSITIVITY AND GESTURE ADAPTATION IN A DUAL DISPLAY SYSTEM

(71) Applicant: Dell Products, LP, Round Rock, TX (US)

(72) Inventors: Lawrence E. Knepper, Leander, TX (US); Deeder M. Aurongzeb, Round Rock, TX (US); Roman Joel Pacheco, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/078,775

(22) Filed: Nov. 13, 2013

(65) Prior Publication Data
US 2015/0130725 A1 May 14, 2015

(51) Int. Cl.
G06F 3/041 (2006.01)
G06F 1/16 (2006.01)
G06F 3/0484 (2013.01)
G06F 3/0488 (2013.01)

(52) U.S. Cl.
CPC .......... *G06F 3/0416* (2013.01); *G06F 1/1643* (2013.01); *G06F 1/1649* (2013.01); *G06F 1/1686* (2013.01); *G06F 1/1694* (2013.01); *G06F 3/04845* (2013.01); *G06F 3/04883* (2013.01); *G06F 2203/04101* (2013.01); *G06F 2203/04806* (2013.01)

(58) Field of Classification Search
CPC ............................. G06F 3/041–3/047; G06F 2203/04101–2203/04113
USPC ........... 345/173–178, 158; 178/18.01–18.09, 178/18.11
See application file for complete search history.

(56) References Cited

U.S. PATENT DOCUMENTS

| 2006/0109259 | A1* | 5/2006 | Ohta .............................. 345/173 |
| 2008/0122798 | A1* | 5/2008 | Koshiyama ........... G06F 3/0412 345/173 |
| 2011/0032199 | A1* | 2/2011 | Seo et al. ....................... 345/173 |
| 2014/0009445 | A1* | 1/2014 | Kim et al. ..................... 345/179 |
| 2015/0077140 | A1* | 3/2015 | Chu ......................... G06F 3/044 324/658 |

FOREIGN PATENT DOCUMENTS

CN WO 2013159483 A1 * 10/2013 ............. G06F 3/044

* cited by examiner

*Primary Examiner* — Stephen Sherman
(74) *Attorney, Agent, or Firm* — Prol Intellectual Property Law, PLLC; H. Kenneth Prol

(57) ABSTRACT

A dual display information handling system includes processor and a housing. The housing includes a display operable to detect a touch device hovering above the display. The information handling system is operable to detect an orientation of the housing, detect an application running on the information handling system, and set a hover sensitivity for the display to a power level selected from a plurality of power levels based upon the operating mode and the application.

20 Claims, 14 Drawing Sheets

DYNAMIC HOVER SENSITIVITY AND GESTURE ADAPTATION IN A DUAL DISPLAY SYSTEM

FIELD OF THE DISCLOSURE

This disclosure relates generally information handling systems, and more particularly relates to touch-screen sensitivity in a dual display information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. In addition, information handling systems may include a variety of hardware and software components that may be configured to process, store, and communicate information and may include one or more computer systems, data storage systems and networking systems. Additionally, information handling systems may have two or more display platforms with one or more display screens for output of images and for input such as by touch screen operation or active pen input.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
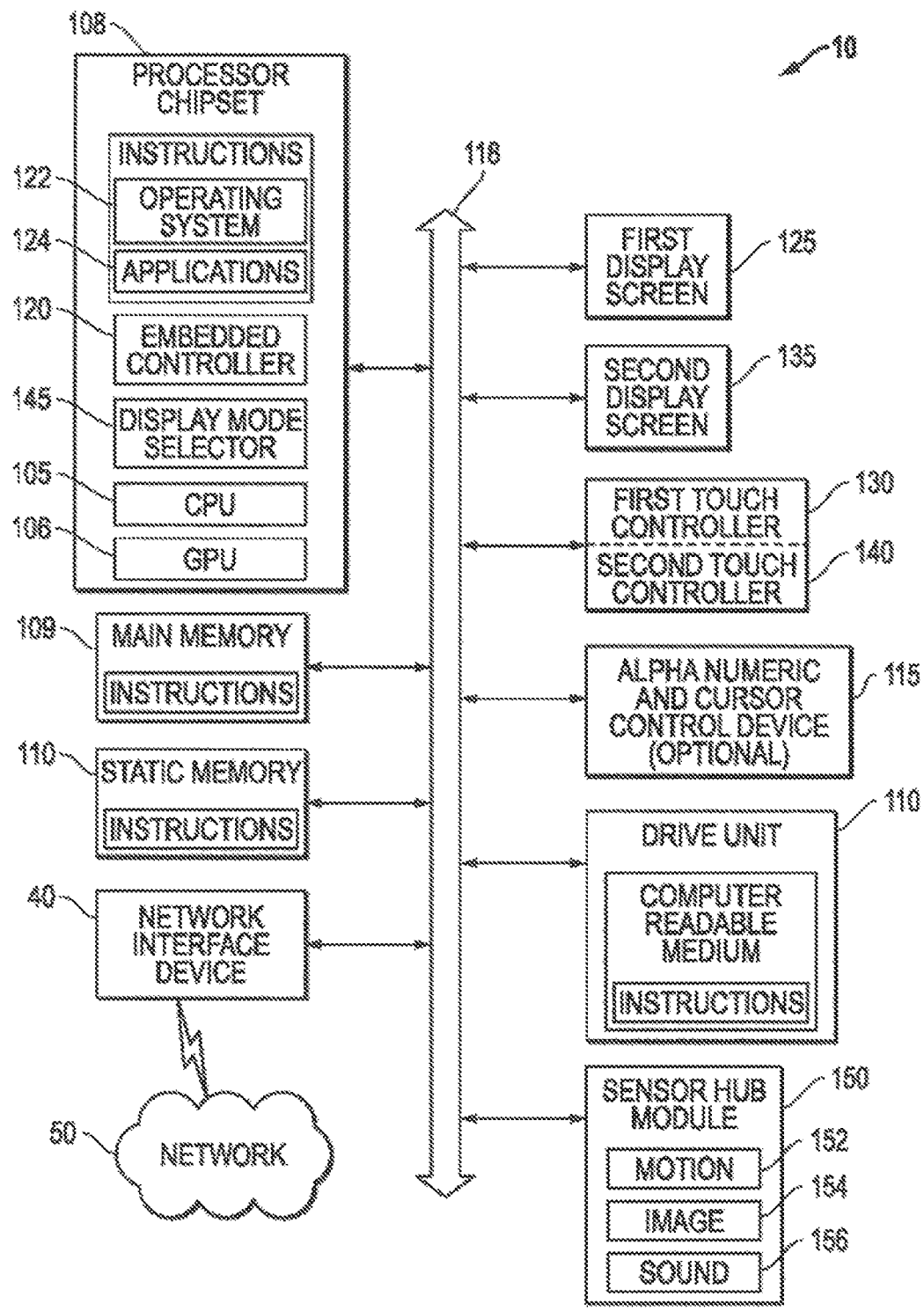
FIG. 1 is a hardware block diagram illustrating a dual display information handling system according to an embodiment of the present disclosure.

FIG. 1 shows a dual display information handling system 10 including conventional information handling systems components of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA/smartphone, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) 105 and related chipset(s) 108 or hardware or software control logic. Additional components of system 10 may include main memory 109, one or more storage devices such as static memory or disk drives 110, an optional external input device 115 such as a keyboard, and a cursor control device such as a mouse, or one or more dual video displays 125 and 135. The information handling system may also include one or more buses 118 operable to transmit communications between the various hardware components.

Multiple display platform information handling systems may be configurable in a plurality of orientations for utilization of and interaction with the information handling system. Hereinafter, the terms dual display screen information handling system or dual display information handling systems, or dual display platform information handling system each may refer to devices with a single display screen such as a flexible display that is layered over or mounted on all or part of two or more display platforms, or each may refer to devices with two or more fully integrated display screens, or each may refer to devices with a plurality of separate display screens that are modularly connectable to the information handling system or to one another. The terms screen or display screen may also refer to a portion of a single display screen, such as a flexible display screen, with a plurality of portions or to an individual display screen. Screens or display screens may herein refer to portions of a display screen and may be mounted on or integrated into one or more display platforms. It is understood that while two display platforms are disclosed in several embodiments herein, embodiments including a plurality of display platforms including three or more display platforms in hinged relationship is also contemplated for the systems and methods disclosed herein. One of ordinary skill would understand implementing the systems and method embodiments discussed herein for these additional embodiments.

More specifically, system 10 represents a mobile user/client device, such as a dual screen mobile tablet computer. System 10 has a network interface device 40, such as for a wireless cellular or mobile networks (CDMA, TDMA, etc.), WIFI, WLAN, LAN, or similar network connection, enabling a user to communicate via a wired or wireless communications network 50, such as the Internet. System 10 may be configured with conventional web browser software. The web browser, may include for example Microsoft Corporation's Internet Explorer web browser software, Firefox or similar such browsers to allow the user to interact with websites via the wireless communications network 50.

System 10 may include several sets of instructions to be run by CPU 105 and any embedded controllers 120 on system 10. One such set of instructions includes an operating system 122 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 124 may be run by system 10. These software applications 124 may enable multiple uses of the dual display information handling system as set forth in more detail below.

System 10 includes a first or primary display screen 125 and a second display screen 135. Each display screen has a display driver operated by one or more graphics processing units (GPUs) such as those that are part of the chipset 108. Each display screen also has an associated touch controller 130, 140 to accept touch input on the touch interface of each display screen. It is contemplated that one touch controller may accept touch input from display screens 125 and 135, or as shown in the current embodiment, two touch controllers 130 and 140 may operate each display screen respectively. In the current embodiment, the first touch controller 130 is associated with the first display screen 125. The second touch controller 140 is associated with the second display screen 135.

The first display screen 125 and the second display screen 135 may also be controlled by the embedded controller 120 of chipset 108. For example, the power to the first display screen 125 and the second display screen 135 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screens and other components of the dual display information handling system. For example, a hover/touch detection sensitivity of the display screens may be increased or decreased based upon a detection power level to the display screens.

A display mode selector 145, in connection with a power management application as described in more detail below, determines what power levels to deploy via the embedded controller 120 based upon orientation of the two display screens 125 and 135 as well as the software applications 124 currently running and active. Determining which applications 124 are running determines a working software application context. Alternatively, the power mode selector may operate on a controller 120 separate from the main CPU chipset(s) 108. Additionally, the power management application may receive state of usage activity input from device state sensors.

System 10 of the current embodiment has a system sensor module 150. Various orientation sensors are included in this module to assist with determining the relative orientation of the dual display information handling system. Subcategories of orientation sensors include motion sensors 152, image sensors 154, and sound sensors 156. Other orientation sensors are contemplated as well including state of usage activity sensors as discussed in more detail below with FIG. 2. Sensor system module 150 is a sensor hub, or an accumulator device, that collects raw data from connected orientation sensors, and organizes and processes data received from the connected sensors. The sensor hub also processes raw sensor data to groom the raw sensor data into a useable form of positional analysis for the dual display information handling system and its display screens. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset via a bus connection such as an Inter-Integrated Circuit (I2C) bus or other suitable type of multi-master bus connection.

The sensor data from the sensor hub is then further groomed by the power management application and the display mode selector 145. A relative orientation of the dual display information handling system in space, the orientation of the two display screens with respect to one another, consideration of state of usage activity data, and working software application context are determined by the power management application and the display mode selector 145 and CPU 105 and embedded controller 120. This relative orientation data of the dual display information handling system, the state of usage activity data, and the working software application context are used by a power management application and display mode selector 145 to determine power levels to be applied to the display screens.

Typically, system 10 may also include microphones and speakers for audio input and output (not shown). The microphones and speakers are connected through an HDA Codec such as the Realtek ALC 5642 or similar such codec. Data from the microphones may serve motion sensing using a Doppler Effect detection of display screen locations. This is discussed further below.

Figure 2:
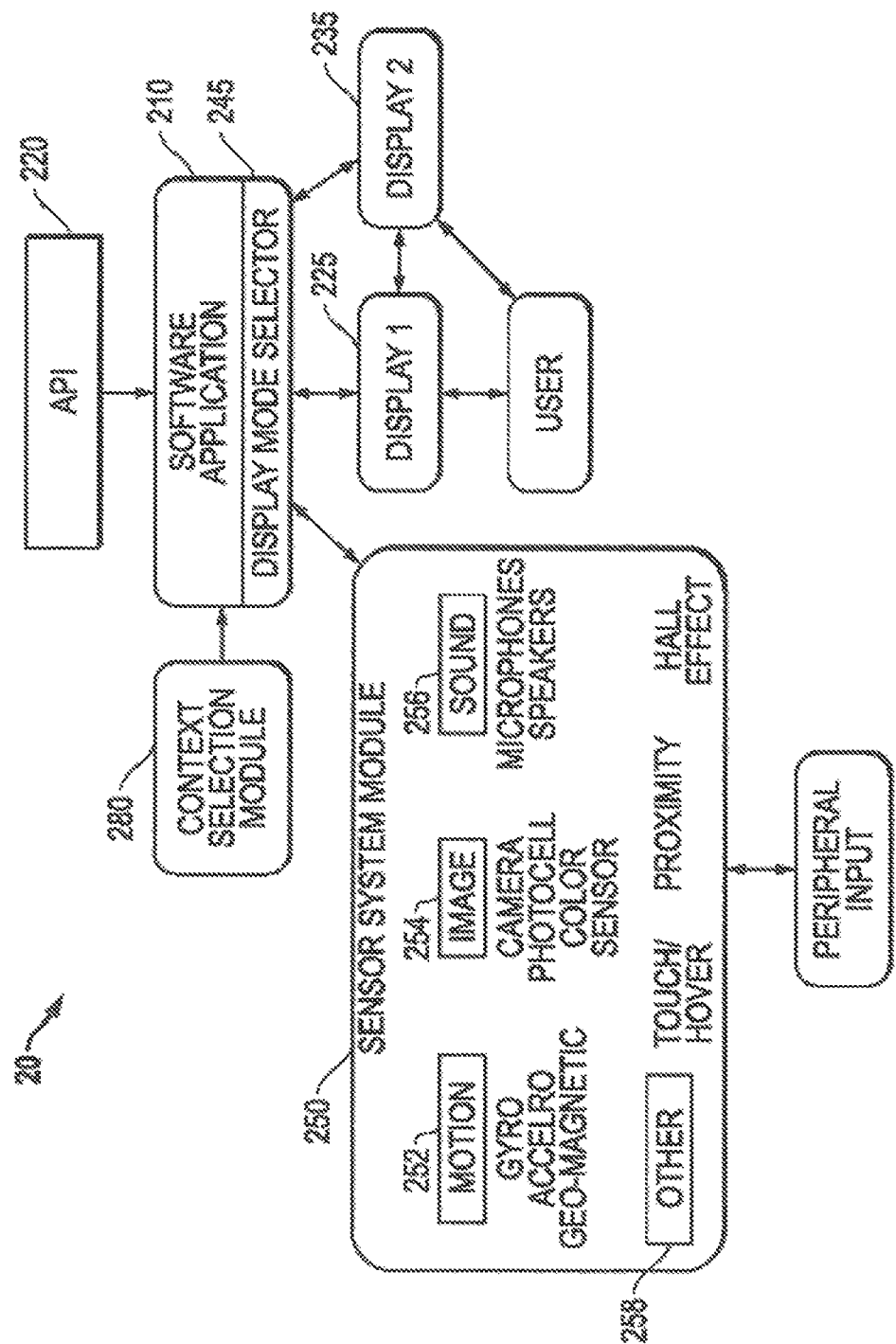
FIG. 2 illustrates a block diagram illustrating the sensors module and working software application context selection module integrated with the power management system of a dual display information handling system according to an embodiment of the present disclosure.

FIG. 2 illustrates a system block diagram of a dual display power management system 20 including sensor module 250 and context selection module 280. Also shown are the first display screen 225 and the second display screen 235 integrated into the dual display information handling system of the current embodiment. The dual display power management system includes a power management application 210 and display mode selector 245 that comprises a set of instructions run on CPU 105 or embedded controller 120 in the chipset(s) 108. The power management application 210 and display mode selector 245 interface with the application programming interface (API) 220 found in the information handling system software to coordinate various software applications. The API may coordinate the power management application and display mode selector 245, sensor hub input data, other independent sensor input types such as camera or touch hover detection applications, display device drivers and PMU/BMU applications controlling power allocation via a power operating system (Power OS).

The power management application 210 and display mode selector 245 receive data from the sensor system module 250 that includes an accumulator sensor hub that gathers sets of data from some or all of the orientation sensors shown. The orientation sensor types include motion sensors 252, image sensors 254, sound sensors 256, and other sensors 258. Some orientation sensors are connected through the sensor hub or accumulator device and system. Other orientation sensors may directly provide data to the dual screen dual display power management system via their own application drivers and data detection systems. For example, the camera system and detection of gaze or presence of a user can operate on a different set of drivers and data be groomed by a software application running on the chipset(s) 108 processors to interpret camera input. This data is then provided to the dual display screen dual display power management system.

Motion sensors 252 may include one or more digital gyroscopes, accelerometers, and magnetometers. Motion sensors 252 may also include reference point sensors. For example, a geomagnetic field sensor may determine position of one or both display screens of the dual-screen information handling system and or the overall dual display information handling system device itself. This positional information may provide x-axis, y-axis, and z-axis positional information of the dual display information handling system relative to magnetic north pole, and thereby provide a reference point of the device position. In one embodiment, a geomagnetic field sensor in combination with another sensor provides x-axis, y-axis, and z-axis positional information for each display screen of the dual display information handling system. With this data, the system determines the relative position of the two display screens to one another in orientation.

Also, a digital gyro and accelerometer may be used to detect motion and changes in position. These sensors may provide a matrix of data. In an example embodiment, the azimuth or yaw, pitch, and roll values of the device are indicated by the raw sensor data. The raw orientation data may be relevant to the dual display power management system 20 as an entire device in one embodiment. In another embodiment, determination of azimuth, pitch, and roll data may be made of individual display screens 225 and 235 in the dual screen power management system 20. In a further embodiment, the two individual display screens are integrably hinged together along one side each display screen. Thus, relative positions of each individual display screen 225 and 235 are important input data to determining power levels to be applied to the display screens, as described below.

In connection with a reference point, such as magnetic north as provided in one embodiment by a geomagnetic field sensor, the azimuth can be determined as a degree of rotation around a z-axis. Note this is different from hinge azimuth angle discussed further below. In an embodiment, the azimuth may be the value of the z-axis relative to the device y-axis as positive angle values between 0° and 360°. It is understood that a different range of values may be assigned in different embodiments.

Based on a reference point such as provided by a geomagnetic field sensor, pitch may be determined as a degree of rotation around the x axis. In an example embodiment, the angle values may range from positive 180° to negative 180° relative to the y-axis, although other value ranges may be assigned instead.

Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

The matrix of raw sensor data from the geomagnetic field sensor and the gyro and accelerometer sensors may be processed partly by a sensor hub or accumulator to provide orientation data for the dual display information handling system device. The sensor hub performs a fusion of data signals received from either a single sensor or multiple sensor devices. As described above in reference to FIG. 1, the sensor hub also processes raw sensor data to groom the raw sensor data into a useable form of positional analysis for the dual display information handling system and its display screens. In the example embodiment, the sensor hub is an independent microcontroller such as the STMicro Sensor Fusion MCU.

No more than three orientation sensors are needed. A reference sensor and a motion sensor associated is attached to one display screen to determine its orientation. A second sensor which is either another reference sensor or a motion sensor associated with or attached to the second screen to provide enough information of location or movement of the second display screen relative to the first display screen to determine the overall orientation mode of the dual display information handling system. Algorithmic calculation of the sensor data from the first display screen, such as a geomagnetic field reference sensor and an accelerometer motion sensor, may be used to determine the orientation of the first display screen according to a geomagnetic field or other reference point. Additional algorithmic calculations of movement data or differences in reference point data from the second display screen are used to determine position or orientation of the second display screen in space relative to the first display screen. The fixed location of the hinge and determination of the position of and relative angle between each of the two display screens also yields positional information on a hinge azimuth angle. The hinge azimuth angle, different from the raw azimuth z-axis measurement discussed above, relates to the orientation of the hinge axis relative to a detected users viewing line or relative to the viewing line most likely to be used by a viewer based on the dual display device's current configuration.

In one example embodiment, two digital gyroscopes may be used, one for each display screen of the dual display information handling system, and a geomagnetic field reference sensor may be used in association with either display screen. In yet another example embodiment, two accelerometers may be used in addition to a reference sensor, one for each display screen of the dual display information handling system. Some sensor types may be combination sensor devices in certain embodiments as is known in the art. For example, a motion sensor may be used that combines the functions of a digital gyroscope and accelerometer to detect motion. Thus, one accelerometer and one digital gyroscope or two gyro-accelerometer combination devices may be used along with at least one reference sensor to determine the dual display information handling system orientation. Any combination of the above reference sensors and motion sensors may be used in a three sensor embodiment to determine orientation of the display screens (e.g. relative angle) and the hinge azimuth angle.

It is contemplated that more sensors associated with each of the first and second display screens provide more data permitting increased accuracy in determination the dual display information handling system orientation. This has trade-offs however in materials cost, space occupancy, and power consumption. Use of dual sensor types in each display screen for the dual display device permits two sets of processed orientation data to be developed by the accumulator. With these two sets of data, display mode selector 245 of the central processor or the embedded controller may determine changes in movement of each display screen of the dual display device. These movement changes indicate relative position of these two display screens 225 and 235 to one another. This provides information permitting the system to understand the location and movement of each of the two display screens relative to one another as well as their position and movement in space overall. Such additional capability may provide more precise determination by the display mode selector of the intended display mode of the dual display information handling system.

The relative measurements of position in space relative to a reference point may be further processed relative to measurements of position from other sensors. For example azimuth, pitch, and roll may establish the position in space of one display screen. Then data from one or more sensors on a second display screen such as a gyroscope, may indicate a different azimuth, pitch, and roll for the second display screen. With position of the two display screens and a known hinge point (or points), the system determines a relative angle between the first display screen and a second display screen. Similarly, the system for determining orientation of the dual display device will know the location of a fixed hinge axis and based on positional information of the two display screens in space. Thus, the dual display power management system determines the hinge azimuth angle relative to the probable viewing line of a user. The viewing line of a user may also be detected with a camera detection system or other proximity sensor to recognize the location of a user relative to the dual display device.

Other techniques are also contemplated to determine relative position and movement of two display screens integrated into a dual display information handling system. For example, Doppler Effect sound sensors 256 may typically include one or more microphones and speakers used in connection with Doppler effect calculations to determine relative position of two display screens in a dual display information handling system. A transmitter and microphone receiver can detect a Doppler shift in sound or ultrasound signal to measure distance or location of the two display screens integrably hinged. In one example, the Doppler Effect sensors may operate in the 0-40 kHz range to detect relative location of the hinged dual screens in an open configuration.

Image sensors 254 may include a camera, photocell or color sensor. A photocell may detect the open or closed state of a dual display information handling system by determining hinged screens are no longer in a closed position when light is detected by the photocell. Additionally, the photocell may detect ambient light levels in determining brightness levels of one or more display screens. A photocell may even be used to indicate when one display screen is oriented face down on a surface such as a table while the other display screen may be actively displaying.

A camera may be used as an image sensor to provide several types of feedback. It may be used as a light sensor similar to a photocell. A camera may also be used to facilitate a reference point for orientation by detecting the presence and location of a user in front of one or more display screen of a dual display information handling system. Location of a user relative to one or both display screens provide a rough user viewing vector that may be used to determine display usage mode by the display mode selector 245. The camera may be tasked to sense the position of a user around the two screens (for example, directly in front, above, below, to the right, or to the left of the plane of the display screen) as well as using facial recognition capability as is known to the art to determine the orientation of the person's face. This information enables the system to correctly orient both displays on the display screens according to a viewing line of sight (or viewing vector) based on position and orientation of the user.

A camera may also be used with gaze detection to determine which screen in a dual-screen information handling system is actively being viewed by a user. Determining which screen between the dual screens is being actively viewed provides additional data for the display mode selector and the dual display power management system application to determine power level implementations that may be appropriate. Eye tracking and gaze technology implementations are available in the art from companies such as Synaptics, Inc. and Tobii Technologies. Description of this technology is found at http://www.synaptics.com/about/press/press-releases/tobii-and-synaptics-unveil-concept-laptop-integrates-eye-tracking-and-touch (press release Jun. 25, 2013). Use of eye tracking and gaze technology in the present disclosure permits control over determination of which display screen is active in a dual display information handling system. Power may be reduced to a non-active display screen depending on the application being used and physical orientation of the system.

In addition to motion sensors 252, image sensors 254, and sound sensors 256, other sensors 258 such as a variety of state of usage activity sensors are contemplated. For example, touch or hover sensors may detect which screen is actively being used. Proximity sensors may detect the location of a user relative to one or both display screens. Proximity sensors in one or both display screens may detect the position of a user around the two screens (for example, directly in front, above, below, to the right, or to the left of the plane of the display screen) and thus infer the viewing vector based on the position of the user or users. A Hall Effect sensor may detect when a magnet, of certain polarity and strength, is in proximity to the sensor. It is used to detect the closed position of a device with two sides. For example, a Hall Effect sensor may determine when two integrably hinged display screens are closed onto one another so that a magnet in one screen triggers a Hall Effect sensor in the second screen. Alternatively, a different Hall Effect sensor may determine if the hinged display screens are open to an orientation of 360° so that the back sides of the display screens are in proximity such that a magnet located with one display screen triggers the Hall Effect sensor of the other.

Hall Effect magnets and magnetic sensors may be deployed as a type of motion sensor 252 although it is also a position or state sensor. It is known in the art that a relative angle between a magnetic field source of known polarity and strength may be determined by strength and change to a magnetization vector detected by magneto-resistive detectors of a Hall Effect sensor. Thus, motion and relative angle may also be detected by the Hall Effect sensors. Other detectors are also contemplated such as a hinge angle detector that may be mechanical, electromechanical or another detecting method to determine how far the hinge between the two display screens has been opened. Such detectors are known in the art.

The context selection module 280 determines what software applications are operating on the dual screen information handling system. Categories of working software application contexts such as running office applications for database creation and word processing, note taking, accessing internet data applications, gaming, video playback entertainment, video and voice communications, email and other electronic communication, websurfing, music, mobile applications, and others are grouped according to similarities in usage on a dual screen information handling system. Websurfing and use of some types of mobile applications may have similar usage on a dual screen device. The working software application context data is provided to the display mode selection module 245 of the power management application 210 along with sensor data for orientation and state of usage activity data for determination of a usage mode and power management strategy for the dual screen device.

Figure 3:
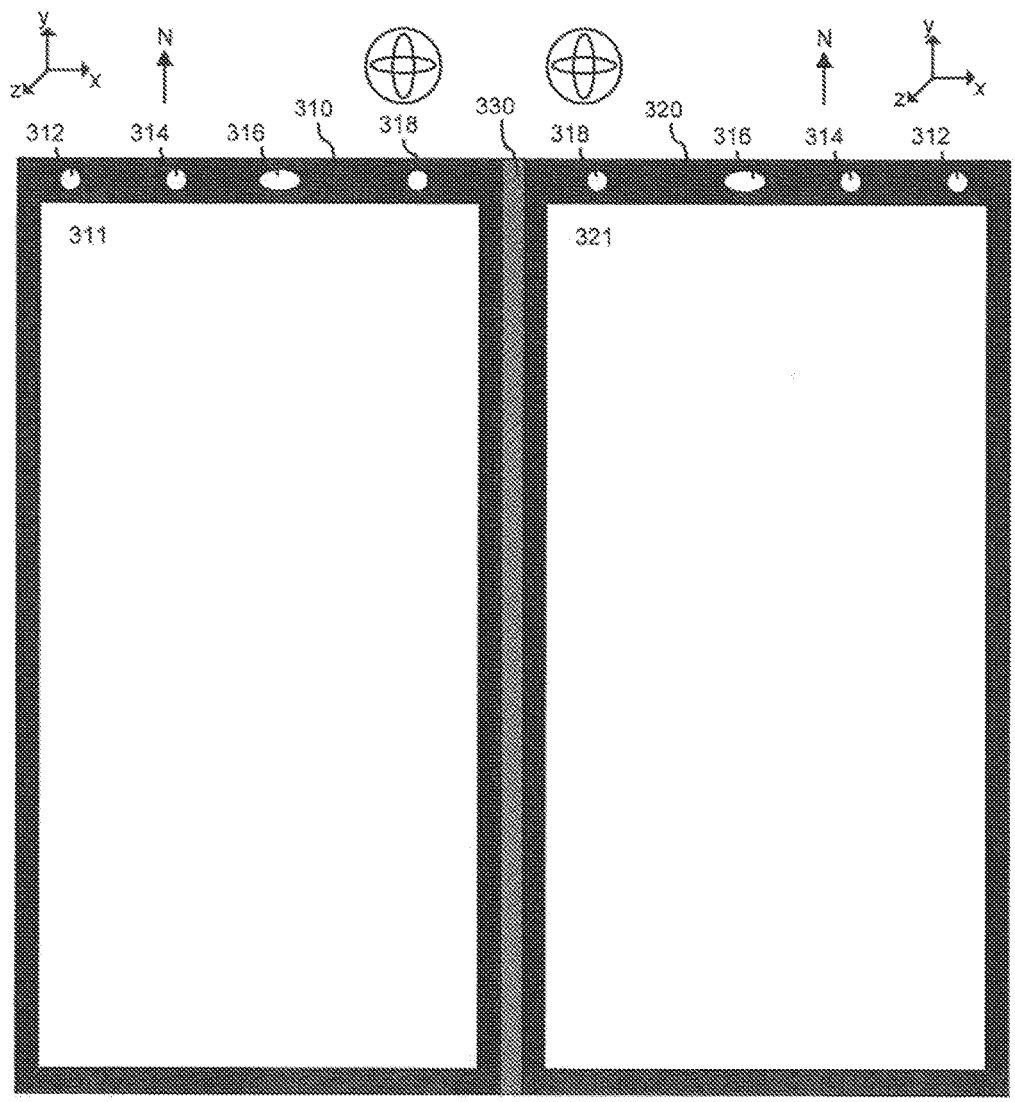
FIG. 3 is an overview illustrating a dual-display information handling system according to an embodiment of the present disclosure.

FIG. 3 illustrates an embodiment of a dual-display information handling system 300 including housings 310 and 320 that are joined together by a hinge mechanism 330. Housing 310 includes a display 311, an orientation sensor 312, a directional sensor 314, a camera 316, and a gyroscopic sensor 318. Housing 320 includes a display 321, an orientation sensor 322, a directional sensor 324, a camera 326, and a gyroscopic sensor 328. Housings 310 and 320 operate to provide information to a user of dual-display information handling system 300. For example, display housing 310 can provide information in conjunction with housing 320, housing 310 can provide information that is separate from and not related to the information that is provided by display housing 320, or only one of display housings 310 or 320 can provide information while the other housing remains blank, as needed or desired.

Displays 311 and 321 represent combined input/output devices for dual-display information handling system 300, such as touch-screen displays, that operate to display the information provided by respective housings 310 and 320. As such, housings 310 and 320 also operate to receive inputs to direct the activities of dual-display information handling system 300, such as by receiving touch-based inputs from respective displays 311 and 321. For example, dual-display information handling system 300 can include one or more instantiations of a touch-screen device enabled operating system, as known in the art, such that one or more of displays 311 and 321 can display a keyboard interface and receive touch-based keyboard inputs. In a particular embodiment, displays 311 and 321 represent gesture-enabled display devices that are equipped to detect the motion of a touch over the surface to the displays. In another embodiment, displays 311 and 321 represent multi-touch-enabled display devices that are equipped to detect two or more simultaneous touch contacts on the surface of the displays. In yet another embodiment, described below, displays 311 and 321 represent hover-sensitive display devices that are equipped not only to detect a touch to the surface of the displays, but also to detect the presence of a touch device that is hovering in proximity over the surface of the displays. The skilled artisan will recognize that displays 311 and 321 are known in the art and include other features and functions, and that the teachings of the present disclosure may incorporate such features and functions. For example, the tool providing the touch or hover over displays 311 and 321 can include a pen-based touch tool, a finger or other human interface, or another tool as needed or desired.

Dual-display information handling system 300 operates to receive input information from orientation sensors 312 and 322, directional sensors 314 and 324, cameras 316 and 326, and gyroscopic sensors 318 and 328. Orientation sensors 312 and 322 represent sensors that operate to determine an orientation in space of respective housings 310 and 320, based upon a three-dimensional coordinate grid established by each orientation sensor and a sensed input to each dimension of the orientation sensors. For example, orientation sensor 312 can determine that housing 310 is oriented horizontally, vertically with a bottom parallel to the ground, vertically with a side parallel to the ground, or in an intermediate orientation.

Direction sensors 314 and 324 represent sensors that operate to determine an orientation with respect to magnetic north of a major axis to respective housings 310 and 320. For example, where housing 310 is oriented horizontally, direction sensor 314 can determine a compass heading of a line oriented along a side of the housing.

Cameras 316 and 326 represent video input devices that are configured to take photographic or video images, and to detect the motion or presence of a pointing device in proximity with the respective housings 310 and 320. In a particular embodiment, one or more of cameras 316 and 326 are further configured to detect the direction of a glance of a user of dual-display information handling system 300. For example, camera 316 can distinguish between a case where a user is looking at the top-left corner of housing 310 and another case where the user is looking at the bottom-right corner of the housing. In this embodiment, one or more of cameras 316 and 326 is further configured to follow the glance of the user as it moves across the respective housing 310 or 320.

Gyroscopic sensors 318 and 328 represent sensors that operate to detect a rotational motion of respective housings 310 and 320, and a rate of the rotational motion. In a particular embodiment, the functions of gyroscopic sensor 318 are provided not by a separate sensor device in housing 310, but the functions are provided by orientation sensor 312. Similarly the functions of gyroscopic sensor 328 can be provided by orientation sensor 322.

Figure 4:
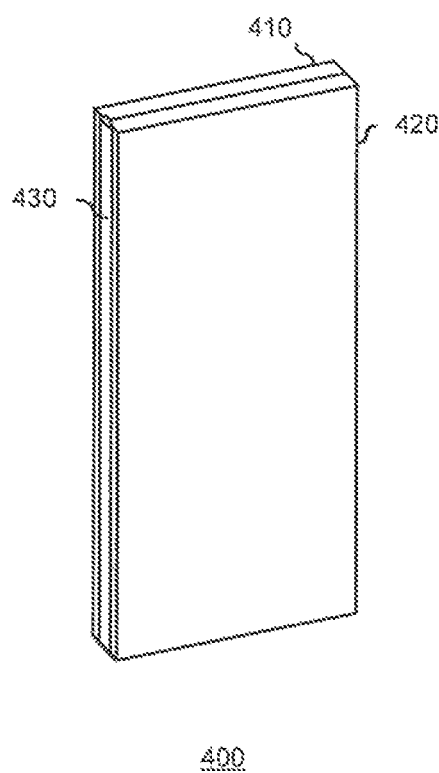
FIGS. 4-8 are views illustrating the dual-display information handling system of FIG. 1 in various configurations.

Hinge mechanism 330 represents a coupling device that connects housing 310 to housing 320. As such, hinge mechanism 330 can include a hinge that joins an edge of housing 310 to an edge of housing 320. Here, hinge mechanism 330 operates to permit housing 320 to swing to any angle between 0 and 360 degrees of arc with respect to housing 310. FIG. 4 illustrates dual-display information handling system 400 in an orientation where housing 420 is swung to a 0 degree angle with respect to housing 410. Here, dual-display information handling system 400 is in a state that is normally associated as a "closed" state. Returning to FIG. 3, dual-display information handling system 300 is here illustrated in an orientation where housing 320 is swung to a 180 degree angle with respect to housing 310. FIGS. 5-8 illustrate various different orientations as described further, below. In a particular embodiment (not illustrated), hinge mechanism 330 further permits housing 320 to rotate with respect to housing 310, such that a back side of housing 320 is presented on the same side of dual-display information handling system 300 as the front side of housing 310. In another embodiment (not illustrated), hinge mechanism 330 provides for housing 320 to be detachable from housing 310, such as by a magnetic coupling between the housings that can be pulled apart.

Dual-display information handling system 300 operates such that inputs from one or more of orientation sensor 312, directional sensor 314, camera 316, and gyroscopic sensor 318 are evaluated in conjunction with inputs from one or more of orientation sensor 322, directional sensor 324, camera 326, and gyroscopic sensor 328 to determine the orientation of housing 320 with respect to housing 310. For example, orientation sensors 312 and 322 can be arranged to have a common orientation with respect to respective housings 310 and 320, such that different sensed orientations between orientation sensor 312 and orientation sensor 322 can be correlated to the relative orientations of the housings. In another example, one or more of cameras 316 and 326 can correlate a portion of the field of view that is inhabited by an opposite housing 320 or 310 to determine the relative orientations. In a particular embodiment, orientations of greater than 180 degrees can be determined by the presence of one or more cameras on backsides of housings 310 or 320. The skilled artisan will recognize that other sensors than the disclosed orientation sensors, direction sensors, cameras, and gyroscopic sensors can be utilized to provide an indication of a relative orientation between housings 310 and 320. For example, a Hall Effect sensor in one housing can be combined with a magnet with a known orientation in the other housing to provide an indication of the relative orientations. Other examples of sensors that can be used to provide an indication of the relative orientations between housings 310 and 320 can include camera-based imaging sensors, microphone-based Doppler location sensors, or other sensors, as needed or desired. Also note that more or less of each type of sensor can be employed on housings 310 and 320, as needed or desired to perform the functions as described herein.

Figure 5A:
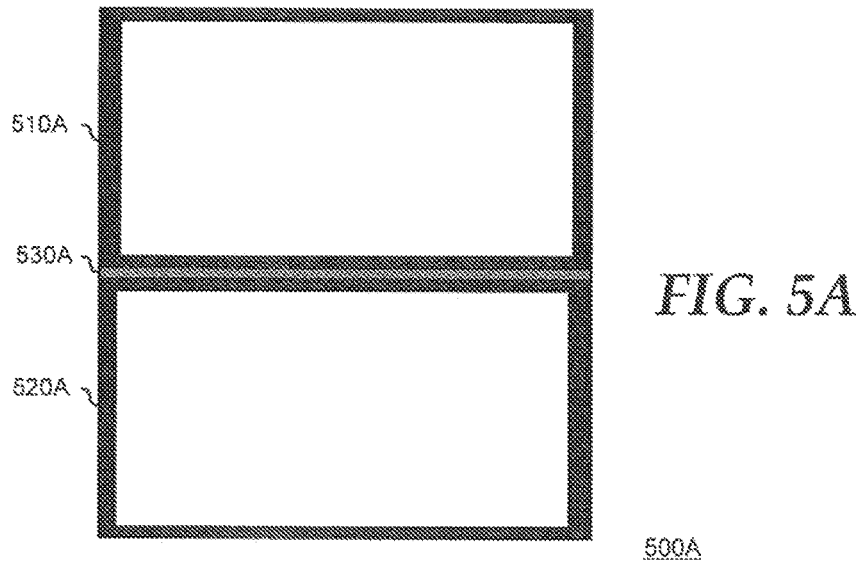
Figure 5B:
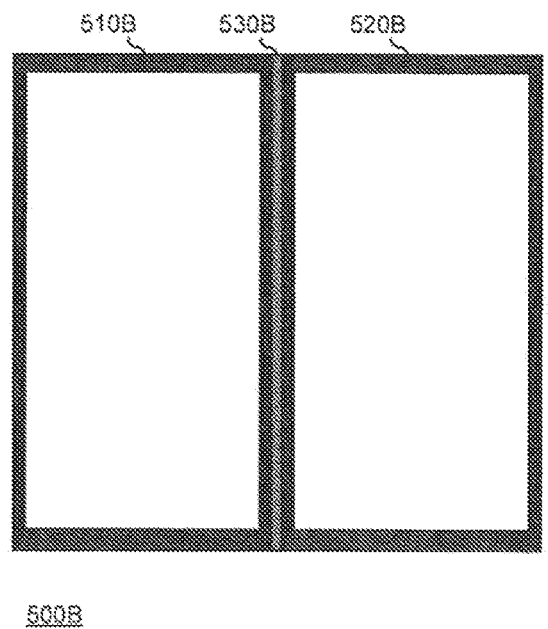
Figure 6:
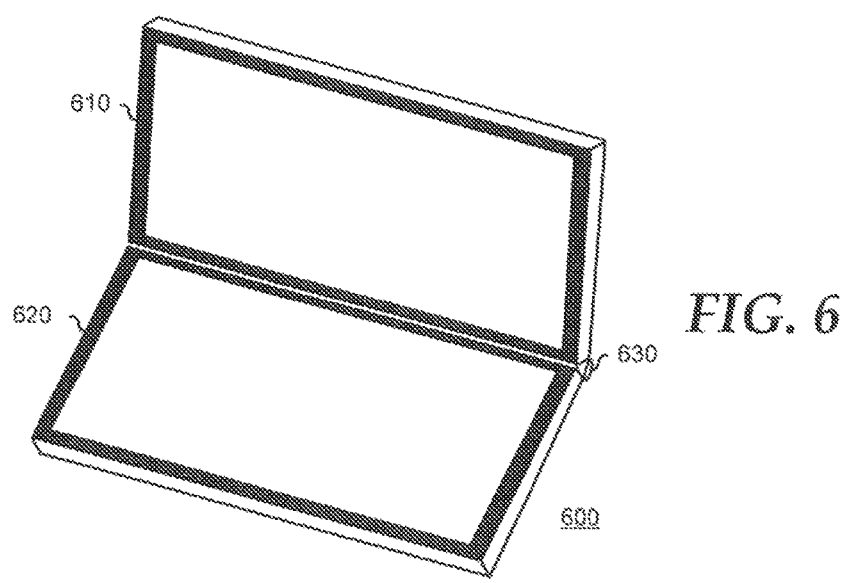
Figure 7A:
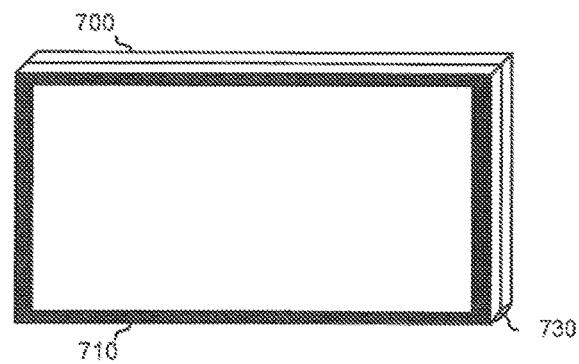
Figure 7B:
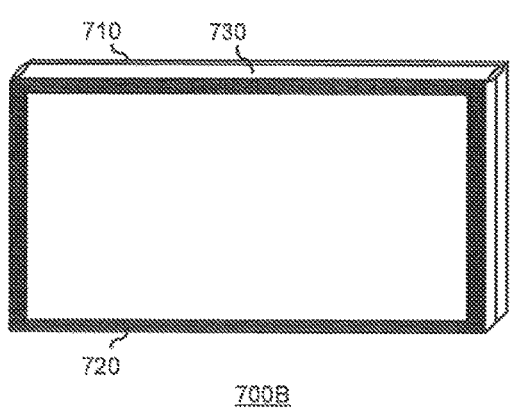
Figure 7C:
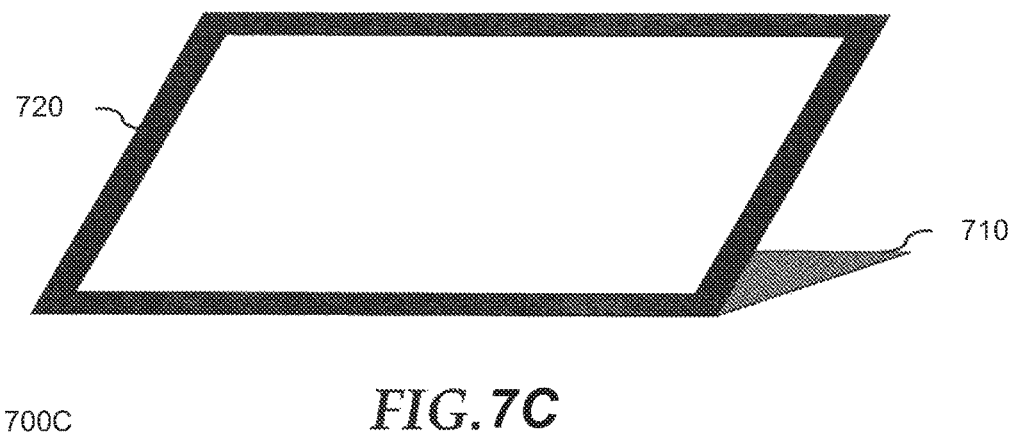
Figure 7D:
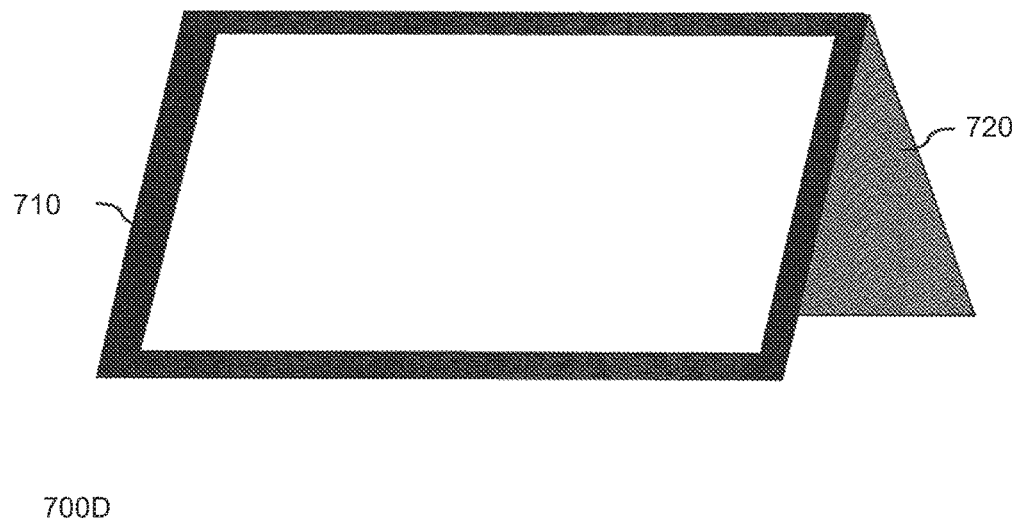

FIGS. 5A and 5B illustrate dual-display information handling system 500 in a landscape orientation 500A, and in a portrait orientation 500B. Note that, where dual-display information handling system 500 is oriented horizontally, that is, substantially parallel with the ground, a determination as to whether the dual-display information handling system is in landscape orientation 500A or portrait orientation 500B can be made based upon a relative location of a user. For example one or more of cameras can determine a location of a user relative to dual-display information handling system 500. Thus, when the user is located near a long edge of either housing 510A or housing 520A, dual-display information handling system 500 can be determined to be in landscape orientation 500A, and when the user is located near a short edge of either housing 510B or housing 520B, the dual-display information handling system can be determined to be in portrait orientation 500B. Further note that, where dual-display information handling system 500 is oriented vertically, or in an intermediate orientation between a vertical orientation and a horizontal orientation, one or more of orientation sensors can be utilized to determine whether the dual-display information handling system is in landscape orientation 500A or in portrait orientation 500B.

Moreover, note that in both landscape orientation 500A and portrait orientation 500B, as illustrated, housing 520 is swung to substantially 180 degrees with respect to housing 510, but this is not necessarily so. In both landscape orientation 500A and portrait orientation 500B, housing 520 can be swung to make a wide range of angles with respect to housing 510 (i.e., angle of between 0 degrees and 360 degrees), thereby providing various operational modes within each of orientations 510 and 520, as will be described below with respect to FIGS. 6-8.

FIGS. 6 and 7A, 7B, 7C, 7D illustrate various operational modes based upon landscape orientation 500A, including a laptop mode 600, media modes 700A and 700B, a presentation mode 700, and a dual-presentation mode 710. In laptop mode 600, dual-display information handling system determines that housing 620 is oriented substantially horizontally, and is swung to between 60 degrees and 120 degrees with respect to housing 610. Laptop mode 600 is suitable for operating dual-display information handling system as a laptop computer. For example, housing 620 can display a touch-sensitive keyboard, and housing 610 can display a desktop image from an operating system.

In media modes 700A and 700B, dual-display information handling system determines that housing 720 is swung to substantially 360 degrees with respect to housing 710. Thus, for example, housing 710 can display a media application to present video content to a user that is facing housing 710. In a particular embodiment, dual-display information handling system determines that a user is facing one of housings 710 or 720 and activates the determined housing. For example, cameras can determine which of housings 710 and 720 a user is facing and can initiate one of media modes 700A or 700B in response. As such, if the user is facing housing 710, then dual-display information handling system is operated in media mode 700A, and if the user if facing housing 720, then the dual-display information handling system is operated in media mode 700B. In another embodiment, dual-display information handling system determines that users are facing both of housings 710 or 720 and activates a dual media mode (not illustrated).

In presentation mode 700D, dual-display information handling system determines that housing 710 is oriented substantially horizontally, and that housing 720 is swung to greater than 270 degrees with respect to housing 710. As such, display 710 can be determined to be facing downward, for example, as when dual-display information handling system is placed upon a flat surface such as a table or a desk. Here, dual-display information handling system can be operated similarly to media mode 700B, and housing 720 can be used to display a media application to present video content to a user that is facing housing 720. In this way, housing 710 acts as a base to hold up housing 720. The skilled artisan will recognize that a similar presentation mode can be achieved that uses housing 720 as the base and uses housing 710 for display purposes. In a particular embodiment, camera provides an automatic light sensing (ALS) function to determine that display 710 is facing downward, such as by detecting a reduced light level, and dual-display information handling system disables display 710 to save power.

In dual-presentation mode 700D, dual-display information handling system determines that housings 710 and 720 are oriented substantially symmetrically with respect to the ground, and that housing 720 is swung to greater than 270 degrees with respect to housing 710, the dual-display information handling system being oriented in a tent-like configuration. Here, dual-display information handling system can be operated similarly to presentation mode 700C, and housing 710 can be used to display a media application to present video content to a user that is facing housing 710. In this way, housing 720 acts as a prop for housing 710. In a particular embodiment, dual-display information handling system determines that a user is facing one of housings 710 or 720 and activates the determined housing. For example, cameras can determine which of housings 710 and 720 a user is facing and can initiate the determined housing in response. As such, if the user if facing housing 710, then housing 710 is activated, and if the user is facing housing 720, housing 720 is activated. In another embodiment, dual-display information handling system determines that users are facing both of housings 710 or 720 and both housings are activated.

Figure 8B:
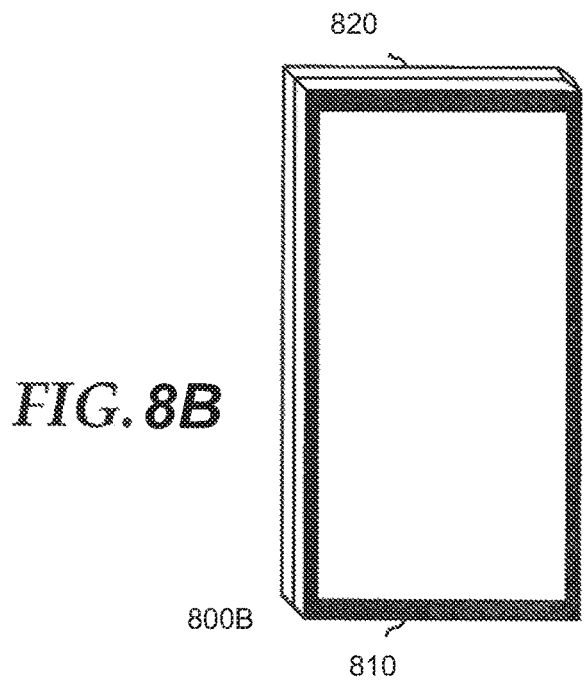
Figure 8A:
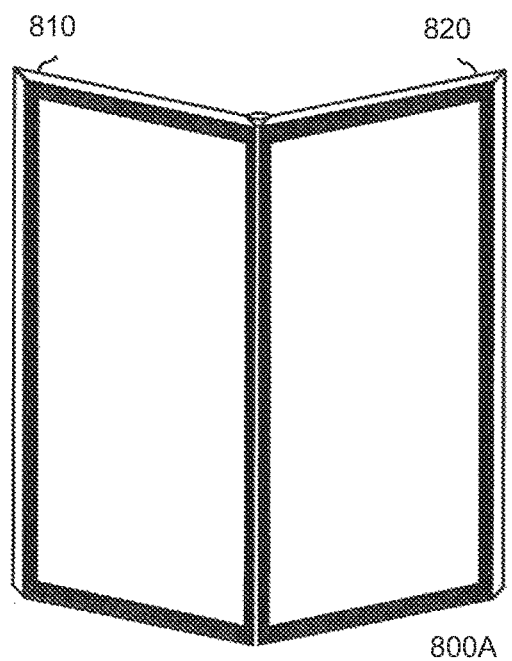

FIGS. 8A and 8B illustrate various operational modes based upon portrait orientation 500B, including a book mode 800A and tablet modes 800B. In book mode 800A, dual-display information handling system determines that the dual-display information handling system is oriented substantially vertically and that housing 820 is swung to between 60 degrees and 180 degrees with respect to housing 810. Book mode 800B is suitable for operating dual-display information handling system as a reader device. For example, housings 810 and 820 can display facing pages of an e-book.

In tablet modes 800B, dual-display information handling system determines that housing 820 is swung to substantially 360 degrees with respect to housing 810. As such, dual-display information handling system can be operated as a tablet device in tablet modes 800B. Thus, for example, housing 810 can display a tablet application to a user that is facing housing 810. In a particular embodiment, dual-display information handling system 300 determines that a user is facing one of housings 810 or 820 and activates the determined housing. For example, cameras can determine which of housings 810 and 820 a user is facing and can initiate one of tablet modes 800B in response. As such, if the user is facing housing 810, then dual-display information handling system is operated in tablet mode 800B, and if the user if facing housing 820, then the dual-display information handling system is operated in tablet mode (not shown). In another embodiment, dual-display information handling system determines that users are facing both of housings 810 or 820 and activates a dual tablet mode (not illustrated).

Figure 9:
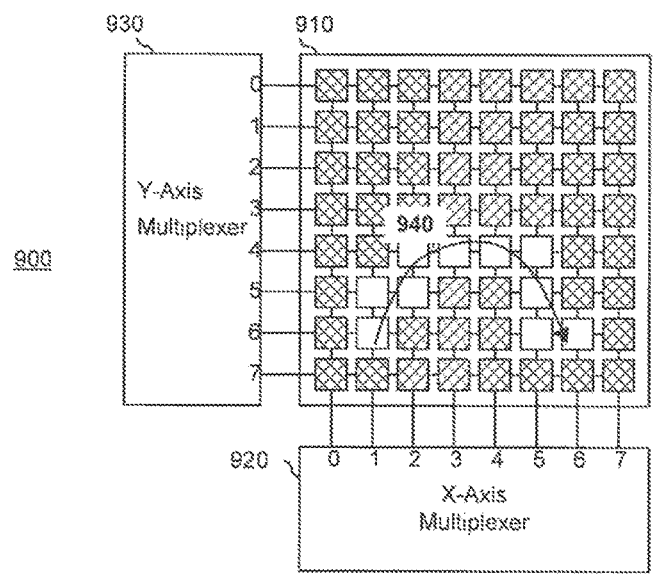
FIG. 9 is a block diagram illustrating a touch-screen display device according to an embodiment of the present disclosure.

FIG. 9 illustrates a touch-screen display device 900 including a touch-screen 910, an x-axis multiplexer 920, and a y-axis multiplexer 930. Touch-screen display device 900 is configured to detect sweeping motion 940 across the surface of touch-screen 910 by a touch device such as a finger or a stylus. Motion 940 is detected as an activation of cells at a sequence of cells of touch-screen 910 that generate signals to multiplexers 920 and 930 that are evaluated to provide a sequence of grid coordinates on the touch-screen that correspond with the motion. In a particular embodiment, touch-screen display device 900 is configured to detect touches to the surface of touch-screen 910 and to detect when a touch device is hovering over the surface of the touch-screen.

Figure 10:
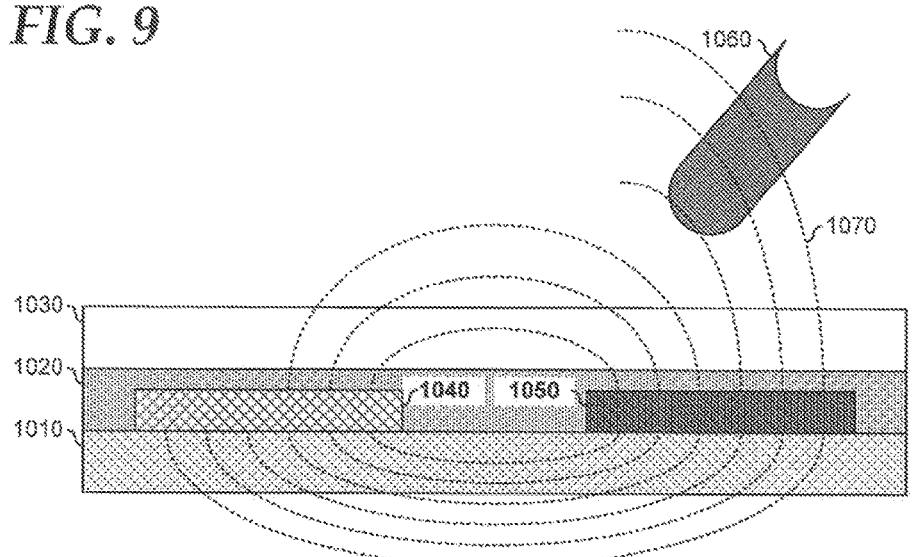
FIGS. 10 and 11 are side views of touch-screens according to an embodiment of the present disclosure.

FIG. 10 illustrates a touch-screen 1000 similar to touch-screen 710, and including a back panel 1010, an adhesive layer 1020, and a front panel 1030. Adhesive layer 1020 embeds an x-axis sense line 1040 and a y-axis sense line 1050 that operate to provide the detection signals for touches to front panel 1030 that are sent to associated x-axis and y-axis multiplexers. For example, a touch device 1060 can be detected in proximity to front panel 1030 by sensing variations in field lines 1070 between x-axis sense line 1040 and y-axis sense line 1050.

Figure 11:
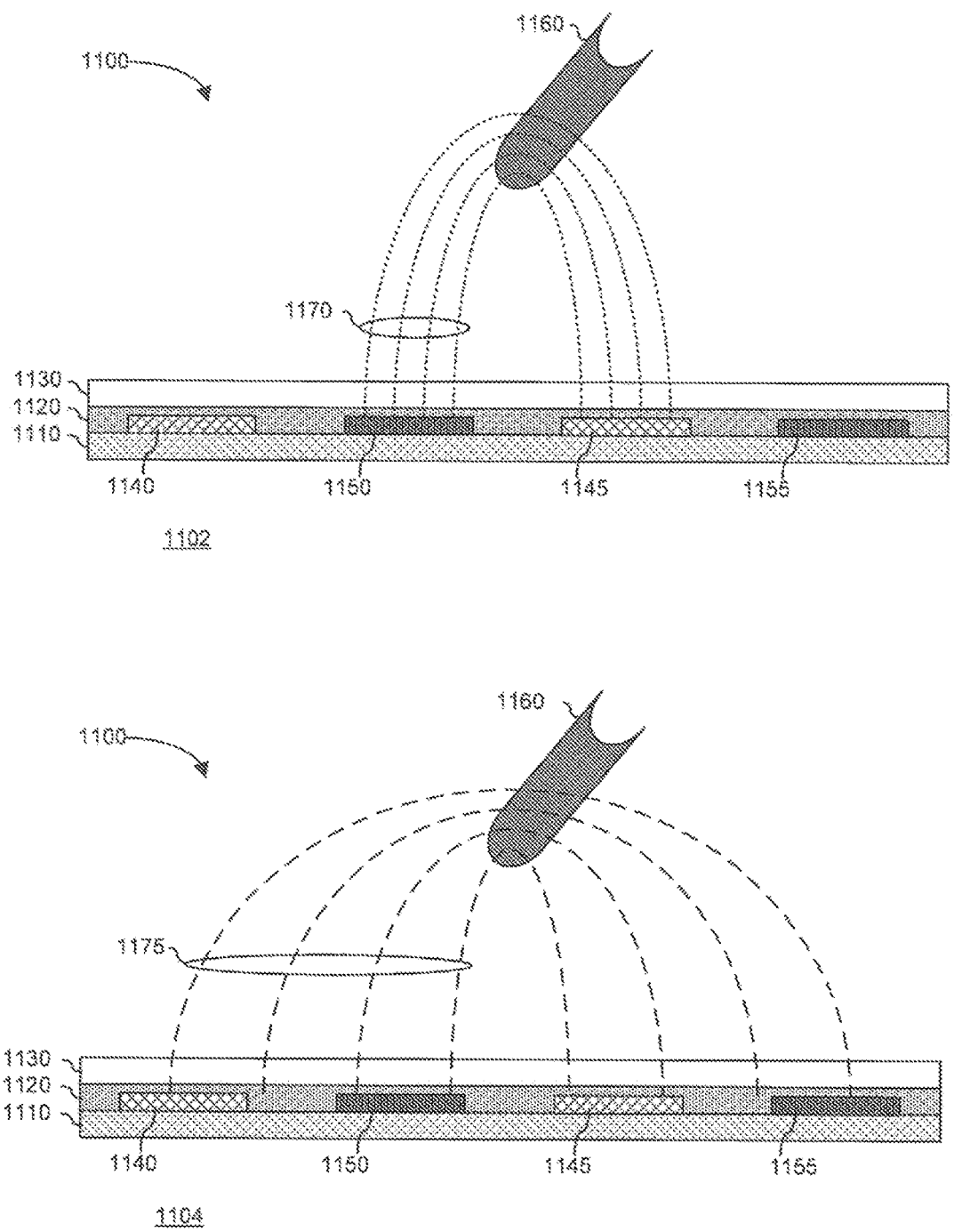

FIG. 11 illustrates a touch-screen 1100 similar to touch-screens 910 and 1000, including a back panel 1110, an adhesive layer 1120, and a front panel 1130. Adhesive layer 1120 embeds x-axis sense lines 1140 and 1145 and y-axis sense lines 1150 and 1155 that operate to provide the detection signals for touches to front panel 1130 that are sent to associated x-axis and y-axis multiplexers. A high-power sense state 1102 is illustrated where a touch device 1160 is detected in proximity to front panel 1130 by sensing variations in field lines 1170 between x-axis sense lines 1145 and y-axis sense lines 1150. In high-power state 1100, field lines 1170 are tightly grouped together, and touch-screen 1100 is capable of more precise detection of the location of touch device 1160 above front panel 1130. As such, in high-power sense state 1102, touch device 1160 is detected as being located precisely above x-axis sense line 1145 and y-axis sense line 1150.

A low-power sense state 1104 is illustrated where touch device 1160 is detected in proximity to front panel 1130 by sensing variations in field lines 1175 between x-axis sense lines 1140 and y-axis sense lines 1150. In low-power sense state 1105, field lines 1175 are loosely grouped together, and the touch-screen is capable of less precise detection of the location of touch device 1160 above front panel 1130. As such, in low-power sense state 1104, touch device 1160 is detected as being located less precisely above x-axis sense lines 1140 and 1145 and y-axis sense lines 1150 and 1155. The skilled artisan will recognize that high-power sense state 1102 and low-power sense state 1104 are illustrative of multiple sense states that may be available with a particular touch-screen, and that a trade-off exists between the power level consumed at a particular sense power level and the resolution that is achievable at that sense power level. Further, the skilled artisan will recognize that in a lower power sense state, touch device 1160 can be detected at a further distance from front panel 1130, and that in a higher power sense state, the touch device will need to be closer to the front panel in order to be detected. In a particular embodiment, the different power sense states are provided by employing a pulse-width modulation scheme and that a longer duty cycle will correlate to a higher power sense state, while a shorter duty cycle will correlate to a lower power sense state.

Figure 12:
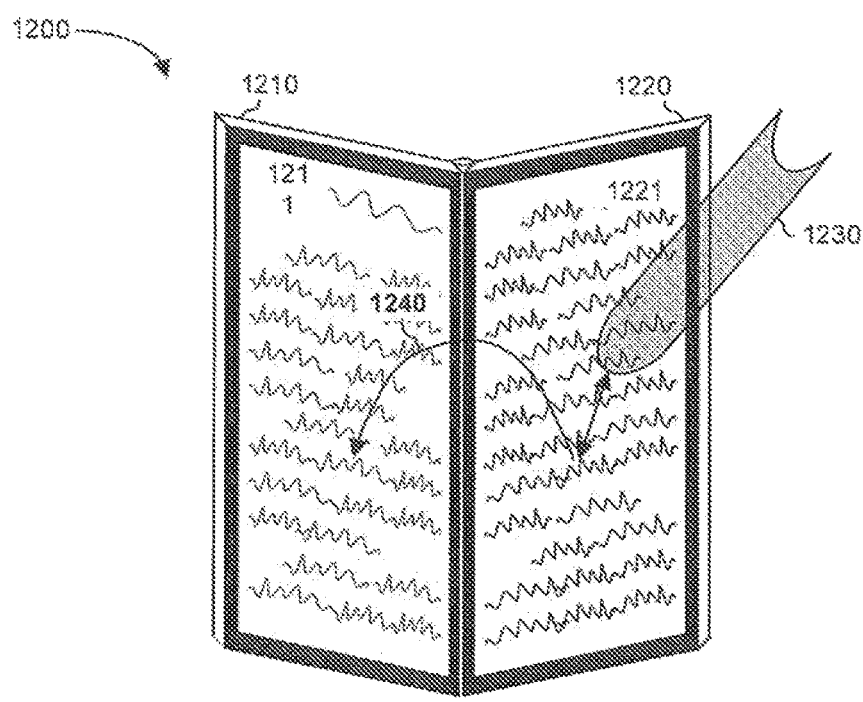
FIG. 12 is a view illustrating dynamic hover sensitivity and gesture adaptation in a dual display system according to an embodiment of the present disclosure.
Figure 12:
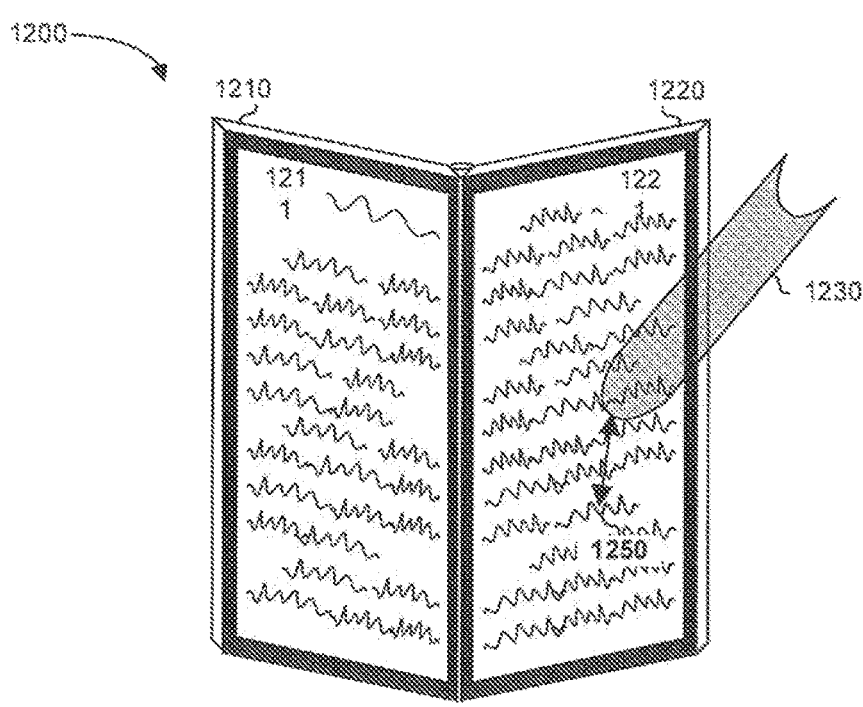

FIG. 12 illustrates a dual-display information handling system 1200 similar to dual-display information handling system 300 and including housings 1210 and 1220 and a touch device 1230. Housing 1210 includes a touch-screen 1211, and housing 1220 includes a touch-screen 1221. Dual-display information handling system 1200 operates to detect an orientation of housings 1210 and 1220, to detect a context (i.e., type of application that is running on the dual-display information handling system), and from the orientation and the context, to determine a usage mode of the dual-display information handling system. Based upon the usage mode, dual-display information handling system 1200 selects a power/sense state in which to operate each of touch-screens 1211 and 1221. For example, dual-display information handling system 1200 can detect that it is oriented substantially vertically, and that housing 1220 is swung to between 90 degrees and 180 degrees with respect to housing 1220, such that the dual-display information handling system is oriented similarly to an open book, and can further detect that the dual-display information handling system is running a book reader program. From this, dual-display information handling system 1200 can determine that the dual-display information handling system is in a book usage mode and the dual-display information handling system can select a low-sensitivity state 1202 for both touch-screens 1211 and 1221, because a common gesture with touch device 1230 while a user is running a book reader program is a swipe 1240 from right to left across the dual-display information handling system to turn the page on the book, and lower resolution is needed to detect that the user wishes to turn the page. Note that swipe 1240 is illustrated as being across both touch-screens 1211 and 1221, but this is not necessarily so, and that gestures similar to swipe 1240 can be detected across either touch-screen 1211, touch-screen 1221, or both. Moreover, the skilled artisan will recognize that a different power/sense state can be selected for touch-screen 1211 than is selected for touch-screen 1221, as needed or desired.

In another example, not illustrated, dual-display information handling system 1200 can detect that it is oriented substantially horizontally, and that housing 1220 is swung to 180 degrees with respect to housing 1220, and can further detect that the dual-display information handling system is running a spreadsheet program. From this, dual-display information handling system 1200 can determine that the dual-display information handling system is configured in a tablet configuration and the dual-display information handling system can select a high-sensitivity state, because a common gesture with touch device 1230 while a user is running a spreadsheet program is a selection of a cell in the spreadsheet, and higher resolution is needed to precisely detect the selected cell.

In a particular embodiment, dual-display information handling system 1200 operates to dynamically change the power/sense state while the dual-display information handling system is in a particular usage mode. For example, where dual-display information handling system 1200 is determined to be in the book usage mode, and the low-sensitivity state 1202 can be selected in preparation for gestures with touch-device 1230 for turning the page. However, when touch-device 1230 is detected to be hovering over a single spot, dual-display information handling system 1200 can select a high-sensitivity state 1204, because another common gesture with the touch device while a user is running a book reader program is to select a word 1250 on the page, and higher resolution is needed to precisely locate the word. In a particular embodiment, other sensors can be used to confirm the gestures performed by touch device 1230. For example, a camera in one of housings 1210 or 1220 can provide video information about the gestures, or an array of microphones can provide Doppler location information about the gestures. Note that, based upon the determined usage mode, dual-display information handling system 1200 can selectively change the power/sense state for one, the other, or both of touch-screens 1211 and 1221, as needed or desired. Further note that the disclosed dynamic selection of power/sense states based upon a usage mode of a device is not limited to dual-display information handling systems, but can similarly be applied to single display devices and multiple display devices, as needed or desired.

In a particular embodiment, a dual-display information handling system similar to dual-display information handling system 1200 implements a policy table to manage the determination of poser sense states, as illustrated in Table 1. Here, an orientation for a dual-display information handling system is determined based upon an orientation of a primary housing, such as being substantially horizontal or substantially vertical, and further based on an angle between the primary housing and the secondary housing, such as being in a particular range of angles. Note that the orientations and angles provided in a policy table can be defined as needed or desired. In a particular embodiment, where a primary housing is determined to be oriented between a 0 degree angle with the ground and a 45 degree angle with the ground, the dual-display information handling system can be determined to be oriented substantially horizontally, and where the primary housing is determined to be oriented between a 45 degree angle with the ground and a 90 degree angle with the ground, the dual-display information handling system can be determined to be oriented substantially vertically. Then, based on a determination of the application or program that is running on the dual-display information handling system, a particular usage mode can be determined and a power/sense state for the touch-screens can be selected. The skilled artisan will understand that the orientations, angle ranges, modes, applications, and sense states shown in Table 1 are examples, and that other orientations, angle ranges, modes, applications, and sense states can be defined as needed or desired.

TABLE 1

| Policy Table | | | | |
|---|---|---|---|---|
| Orientation | Angle (deg.) | Application | Usage Mode | Sense State |
| Any | 0 | N/A | Closed | N/A |
| Horizontal | 60-120 | OS | Laptop | High Power |
| Horizontal | 120-180 | Media | Media/Tablet | Touch Only |
| Vertical | 60-120 | | Book | Low Power |

Figure 13:
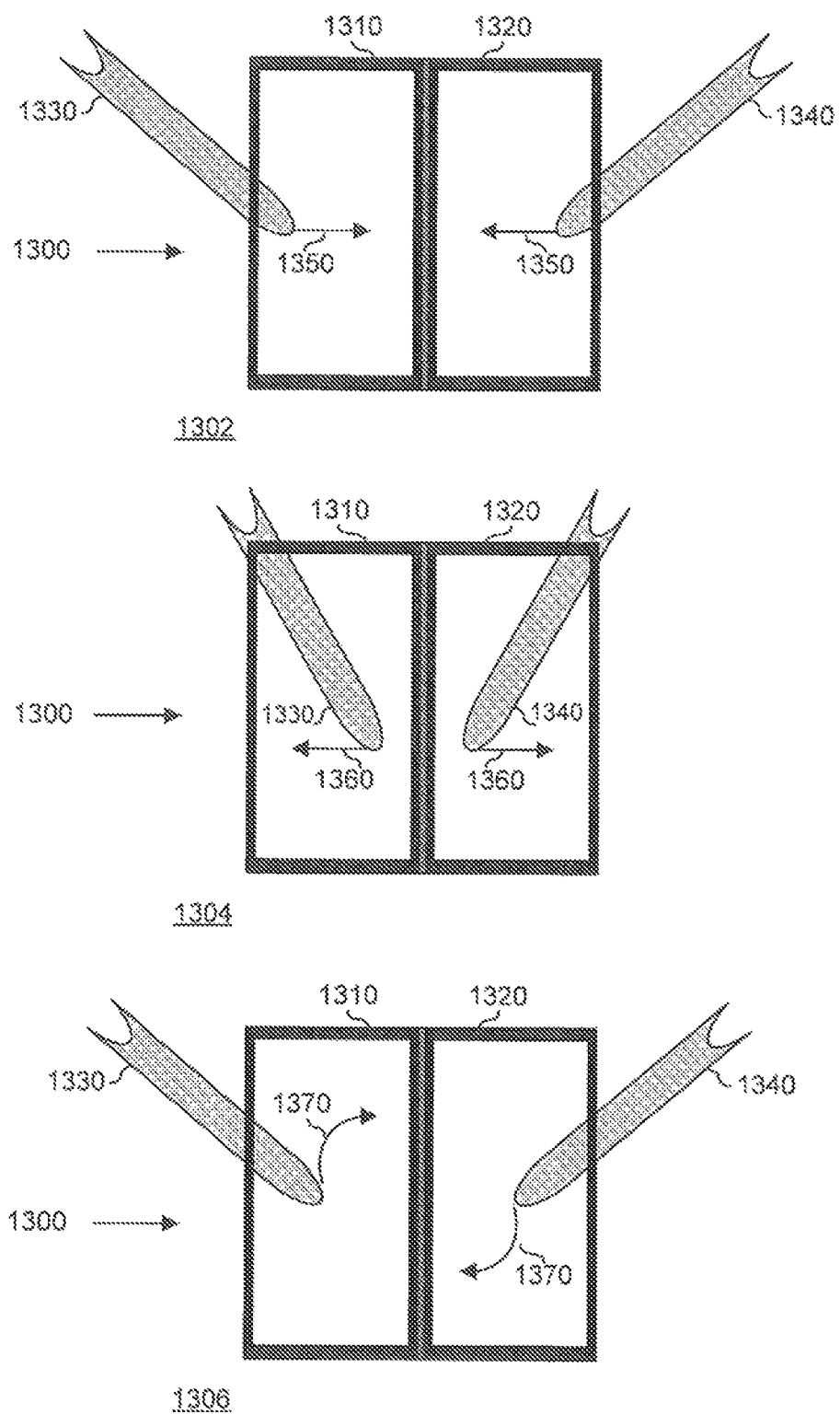
FIG. 13 is a view illustrating a multi-hover-enabled dual display system according to an embodiment of the present disclosure.

FIG. 13 illustrates a dual-display information handling system 1300 similar to dual-display information handling system 300 and including housings 1310 and 1320 and touch devices 1330 and 1340. Dual-display information handling system 1300 operates to provide multi-hover gesture detection by combining information regarding a gesture of touch device 1330 over housing 1310 with information regarding a simultaneous gesture of touch device 1340 over housing 1320. In a first gesture 1302, touch device 1330 is located in a hover above housing 1310, touch device 1340 is located in a hover above housing 1320, and the touch devices are brought together 1350. For example, where touch devices 1330 and 1340 represent fingers of a user, the user can hover the one finger over each of housings 1310 and 1320, and pinch the fingers together, such as to zoom out on an image. In another gesture 1304, touch device 1330 is located in a hover above housing 1310, touch device 1340 is located in a hover above housing 1320, and the touch devices are moved away from each other 1360. For example, where touch devices 1330 and 1340 represent fingers of a user, the user can hover the one finger over each of housings 1310 and 1320, and spread the fingers apart, such as to zoom in on an image. In yet another gesture 1306, touch device 1330 is located in a hover above housing 1310, touch device 1340 is located in a hover above housing 1320, and the touch devices are rotated about each other 1360. For example, where touch devices 1330 and 1340 represent fingers of a user, the user can hover one finger over each of housings 1310 and 1320, and rotate the fingers, such as to rotate an image. In this way, a touch-screen that does not include a dual-hover detection capability can be enabled, in combination with a second touch-screen, to simulate dual-hover gestures. It will be understood that gestures 1302, 1304, and 1306 are exemplary, and that other dual-hover gestures can be utilized and detected in accordance with the teachings herein.

Figure 14:
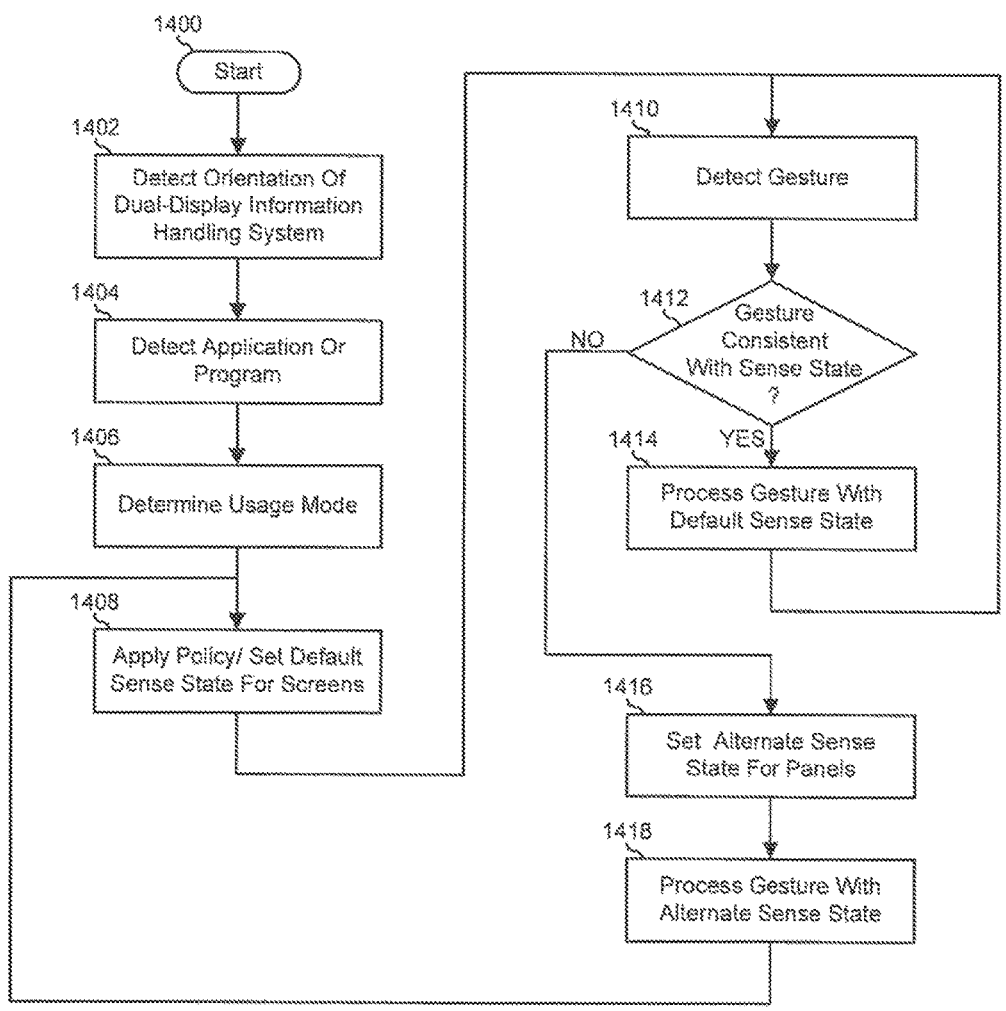
FIG. 14 is a flowchart illustrating a method for dynamic hover sensitivity and gesture adaptation in a dual display system according to an embodiment of the present disclosure.

FIG. 14 illustrates a method for dynamic hover sensitivity and gesture adaptation in a dual display system starting at block 1400. The orientation of a dual-display information handling system is detected in block 1402. For example, a dual-display information handling system can be detected as being oriented similarly to an open book, as a tablet device, or in another orientation, as needed or desired. An application or program running on the dual-display information handling system is detected in block 1404. For example, the dual-display information handling system can be running a book reader application, a web browser, a spreadsheet, or another application or program, as needed or desired. Based upon the detection of the orientation and the detection of the running application or program, the dual-display information handling system determines a usage mode for the dual-display information handling system in block 1406. For example, the dual-display information handling system can include a policy table that determines a usage mode based upon the orientation information and the angle information.

Based upon the usage mode, a policy is applied to select a default power/sense state for the touch-screens of the dual-display information handling system in block 1408. For example, the dual-display information handling system can be determined to be in a book mode, and so the dual-display information handling system can select a low-sensitivity state to detect hover gestures with less resolution and at a higher distance from the surface of the housings.

A gesture is detected in block 1410. A decision is made as to whether or not the gesture is consistent with the default power/sense state in decision block 1412. Here, continuing the example above, where the dual-display information handling system is in a book mode, the gesture can be a sweeping gesture that is consistent with the default, low power state, or the gesture can be a hover gesture that indicates that a higher power state is desired. If the gesture is consistent with the default sense state, the "YES" branch of decision block 1412 is taken, the gesture is processed using the default sense state in block 1414, and the method returns to block 1410 to await detection of another gesture. If the gesture is not consistent with the default sense state, the "NO" branch of decision block 1412 is taken, an alternate sense state for the housings is set in block 1416, the gesture is processed using the alternate sense state in block 1418, and the method returns to block 1408 where the default sense state is reset.

Figure 15:
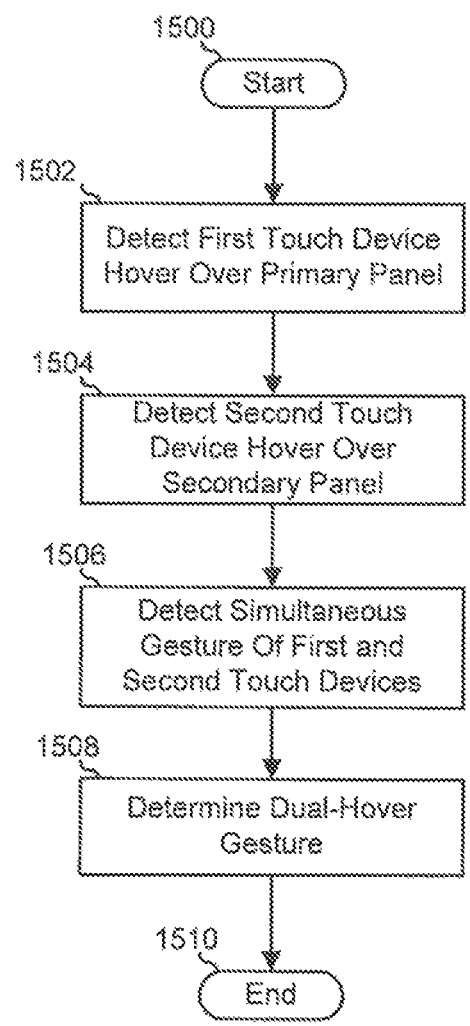
FIG. 15 is a flowchart illustrating a method for dual-hover gesture adaptation in a dual display system according to an embodiment of the present disclosure.

FIG. 15 illustrates a method for dual-hover gesture adaptation in a dual display information handling system starting at block 1500. A first touch device is detected to be hovering over a primary housing of a dual-display information handling system in block 1502, and a second touch device is detected to be hovering over a secondary housing in block 1504. For example, a user may place a first finger hovering over a first housing, and a second finger hovering over a second housing. The first and second touch devices are detected to move simultaneously over the respective primary and secondary housings in block 1506. Thus, continuing the above example, the user can pinch the fingers together, spread the fingers apart, rotate the fingers, or provide another motion of the fingers. The detected motion of the touch devices is determined to be a dual-hover gesture by the dual-display information handling system in block 1508, and the method ends in block 1510.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a processor; and
    a first housing including a first display operable to detect a touch device hovering above a first display and operable to receive touch inputs;
    wherein the information handling system is operable to:
        detect a first orientation of the first housing;
        detect a first application running on the information handling system;
        set a first hover sensitivity for the first display to a first power level selected from a plurality of power levels, based upon the first orientation and the first application, and
        wherein the first hover sensitivity corresponds to resolution of detecting the hovering touch device location over the first display.

2. The information handling system of claim 1, further comprising:
    a second housing including a second display operable to detect the touch device hovering above the second display and operable to receive touch inputs, wherein the second housing is coupled to the first;
    wherein the information handling system is further operable to set a second hover sensitivity for the second display to a second power level selected from the plurality of power levels, based upon a second orientation of the second housing relative to the first housing and upon the first application.

3. The information handling system of claim 2, wherein the first orientation is detected based upon first information from a first sensor of the first housing and the second orientation is detected based upon second information from a second sensor of the second housing.

4. The information handling system of claim 3, wherein the first sensor and the second sensor include at least one of an orientation sensor, a direction sensor, a camera, and a gyroscopic sensor.

5. The information handling system of claim 1, wherein the information handling system is further operable to:
    detect a second application running on the information handling system; and
    adjust the first hover sensitivity to a second power level selected from the plurality of power levels, based upon the first orientation and the second application,
    wherein the adjusted first hover sensitivity adjusts the resolution of the detected hovering touch device location.

6. The information handling system of claim 1, wherein the information handling system is further operable to:
- detect a first gesture of a touch device over the first display;
- determine that the first gesture is associated with the first power level; and
- process the first gesture using the first hover sensitivity.

7. The information handling system of claim 6, wherein the information handling system is further operable to:
- detect a second gesture of the touch device over the first display;
- determine that the second gesture is not associated with the first power level;
- adjust the first hover sensitivity to a second power level based upon the determination that the second gesture is not associated with the first power level; and
- process the second gesture using the adjusted first hover sensitivity.

8. The information handling system of claim 7, wherein the information handling system is further operable to:
- reset the first hover sensitivity from the second power level to the first power level after processing the second gesture.

9. The information handling system of claim 1, wherein the first housing comprises a hover-sensitive touch-screen display that operates at a hover sensitivity selected from among a plurality of hover sensitivity levels associated with the plurality of power levels depending on the distance the touch device will hover above the first display for the first application.

10. The information handling system of claim 9, wherein the touch-screen display is operable to:
- detect a touch device hovering at a first distance over the touch-screen device when operating with a second hover sensitivity of the plurality of hover sensitivities; and
- detect the touch device hovering at a second distance over the touch-screen device, the second distance being greater than the first distance, when operating with a third hover sensitivity of the plurality of hover sensitivities.

11. The information handling system of claim 1, wherein setting the first power level of the first hover sensitivity to a higher power state yields more tightly grouped field lines for higher resolution.

12. A method comprising:
- detecting, by a first sensor of a first housing of an information handling system, a first orientation of the first housing;
- detecting an application running on the information handling system;
- setting a first hover sensitivity for a first display having a first touchscreen for receiving touch inputs of the first housing to a first power level of a plurality of power levels based upon the orientation and the application;
- detecting, by a second sensor of a second housing of the information handling system, a second orientation of the second housing relative to the first housing; and
- setting a second hover sensitivity for a second display having a second touchscreen for receiving touch inputs of the second housing to a second power level of the plurality of power levels based upon the second orientation and the application,
- wherein the first hover sensitivity and the second hover sensitivity are set for resolution of detecting the hovering touch device location over the first display.

13. The method of claim 12, wherein the first sensor and the second sensor include at least one of an orientation sensor, a direction sensor, a camera, and a gyroscopic sensor.

14. The method of claim 12, further comprising:
- detecting a first gesture of a touch device over the first housing;
- determining that the first gesture is associated with the first power level; and
- processing the first gesture using the first hover sensitivity.

15. The method of claim 14, further comprising:
- detecting a second gesture of the touch device over the first housing;
- determining that the second gesture is not associated with the first power level;
- adjusting the first hover sensitivity to a second power level based upon the determination that the second gesture is not associated with the first power level; and
- processing the second gesture using the adjusted first hover sensitivity.

16. The method of claim 15, further comprising:
- resetting the first hover sensitivity from the second power level to the first power level after processing the second gesture.

17. The method of claim 12, wherein the first housing comprises a hover-sensitive touch-screen display that operates at the first hover sensitivity and a second hover sensitivity.

18. The method of claim 17, further comprising:
- detecting a touch device hovering at a first distance over the touch-screen device when operating with the first hover sensitivity; and
- detecting the touch device hovering at a second distance over the touch-screen device, the second distance being greater than the first distance when operating with the second hover sensitivity.

19. The method of claim 12, wherein the application includes at least one of a book reader, a web browser, and a spreadsheet application.

20. The method of claim 12, wherein setting the first power level of the first hover sensitivity to a lower power state yields detection of a touch device hovering over the first housing at a further distance.

* * * * *